C. W. SALADEE,

Assignor, by Mesne Assignments, to R. LOERCHER.

Harness-Buckles.

No. 8,829. Reissued July 29, 1879.

Witnesses:
John C. Tumbridge.
W. H. E. Schultz.

Inventor:
Cyrus W. Saladee
by his attorney
A. V. Briesen

N. PETERS. PHOTO-LITHOGRAPHER, WASHINGTON D. C.

UNITED STATES PATENT OFFICE.

CYRUS W. SALADEE, OF WASHINGTON, DISTRICT OF COLUMBIA, ASSIGNOR, BY MESNE ASSIGNMENTS, TO ROBERT LOERCHER, OF NEW YORK CITY.

IMPROVEMENT IN HARNESS-BUCKLES.

Specification forming part of Letters Patent No. 47,574, dated May 2, 1865; Reissue No. 8,829, dated July 29, 1879; application filed June 27, 1879.

*To all whom it may concern:*

Be it known that I, CYRUS W. SALADEE, formerly of Putnam, Muskingum county, in the State of Ohio, at present residing at Washington, county of Washington, and District of Columbia, have invented certain new and useful Improvements in Buckles for Harness, &c.; and I do hereby declare that the following is a full and exact description thereof, reference being had to the accompanying drawings, and to the letters of reference thereon marked.

Figure 1:
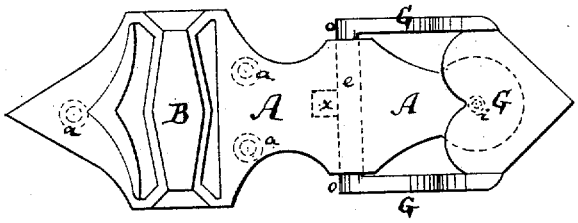
Figure 2:
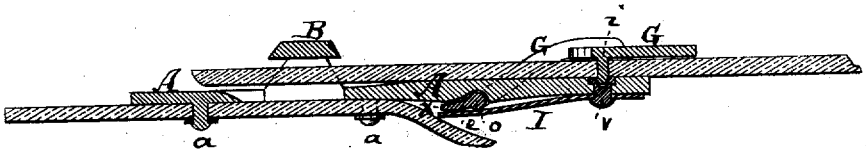

Figure 1 is a plan view, and Fig. 2 a section, of my improved buckle for harness, &c.

My invention consists in pivoting the buckle to the projecting end of a metallic plate carrying a loop, in combination with fastening-pins; also, in a peculiar construction of buckle, as hereinafter more fully described.

In the drawings, A is the metallic buckle-plate, provided with rivets *a*, by which it is secured to the upper surface of the strap. B is the metallic loop for confining the loose end of the other strap, which loop is rigid on the plate A.

The front end of the plate A is provided with a grooved recess, *e*, in its under side, in which the back bar of the buckle is pivoted.

G is the buckle, its back bar *o* being provided with a short lever, *x*, and turning in the groove *e*.

The under side of the front bar of the buckle is provided with a short stud, *i*, which takes into a corresponding indentation, *v*, in the upper side of the plate A.

I is a flat steel spring, the front end of which is secured by a rivet to the front end of plate A, the rear end of said spring pressing against the lever *x* of the back bar of the buckle, so as to keep it in the groove *e*, and at the same time force the front ends of the plate A, which is tongue-shaped, and the buckle together, so as to make the stud *i* take into the hole *v*.

If preferred, the stud *i* may be put upon the tongue or plate A instead of upon the buckle, and may take into a corresponding hole in the front bar of the buckle.

In using my improved buckle, the strap to be held is placed between the front bar of the buckle and the tongue and drawn as tightly as desired, the spring forcing the front bar down upon the strap, so that the stud shall take into each hole of the strap as it arrives.

The front side of stud *i* should be rounded off somewhat, so as to allow the strap to slip over it when being tightened.

There is a peculiar advantage possessed by this buckle. It is not necessary to slacken the strap in order to unbuckle it, as is the case with other buckles. I have only to lift up the front-bar of the buckle about an eighth of an inch in order to lift the stud *i* out of the hole in the strap, which thus frees the strap. The importance of this advantage is self-evident.

Having fully described my invention, what I claim as new, and desire to secure by Letters Patent, is—

1. The buckle G, in combination with the plate A, having the tongue-extension, all substantially as shown and described.

2. The buckle-frame pivoted to the tongue-extension portion of plate A, all substantially as set forth.

3. The buckle-frame G, provided with stud *i*, in combination with the buckle-tongue A, having an indentation for the reception of said stud, substantially as specified.

4. The plate A, provided with the loop and with fastening-pins, in combination with the buckle-frame, which is pivoted to said plate, substantially as set forth.

In testimony that I claim the above I hereunto set my hand.

CYRUS W. SALADEE.

Witnesses:

CHARLES E. FOSTER,

R. LOERCHER.